(12) United States Patent
Davis et al.

(10) Patent No.: US 6,801,696 B2
(45) Date of Patent: Oct. 5, 2004

(54) FIBER OPTIC CABLE STRUCTURE AND METHOD

(75) Inventors: C. Shawn Davis, Lilburn, GA (US); H. Paul Debban, Snellville, GA (US); Lisa A. Dixon, Atlanta, GA (US); Peter A. Weimann, Atlanta, GA (US)

(73) Assignee: Fitel USA Corp., Norcross, GA (US)

( * ) Notice: Subject to any disclaimer, the term of this patent is extended or adjusted under 35 U.S.C. 154(b) by 218 days.

(21) Appl. No.: 10/166,223

(22) Filed: Jun. 7, 2002

(65) Prior Publication Data

US 2003/0228116 A1 Dec. 11, 2003

(51) Int. Cl.$^7$ ................................................. G02B 6/44
(52) U.S. Cl. ........................ 385/109; 385/100; 385/111
(58) Field of Search ................................. 385/100–119

(56) References Cited

U.S. PATENT DOCUMENTS 5,911,023 A * 6/1999 Risch et al. ................. 385/100
6,411,403 B1 * 6/2002 Siddhamalli ................. 385/109
6,524,702 B1 * 2/2003 Betso et al. ................. 428/379

* cited by examiner

Primary Examiner—Karl D. Frech
(74) Attorney, Agent, or Firm—Thomas, Kayden, Horstemeyer & Risley, LLP

(57) ABSTRACT

An optical fiber cable structure including a tube comprised of inorganic fillers dispersed within a soft resin, the tube housing optical fibers or ribbons surrounded by a water blocking material. The use of the inorganic fillers in the soft resin provides a cable structure with superior blowing performance due to low surface friction and high flexibility, allowing more effective installation of the fiber optic cable via blowing techniques The use of the inorganic fillers in the soft resin also reduces the thermal expansion/contraction of the cable structure, and increases the compression resistance of the cable structure to axial loads, providing protection to the optical fibers.

46 Claims, 2 Drawing Sheets

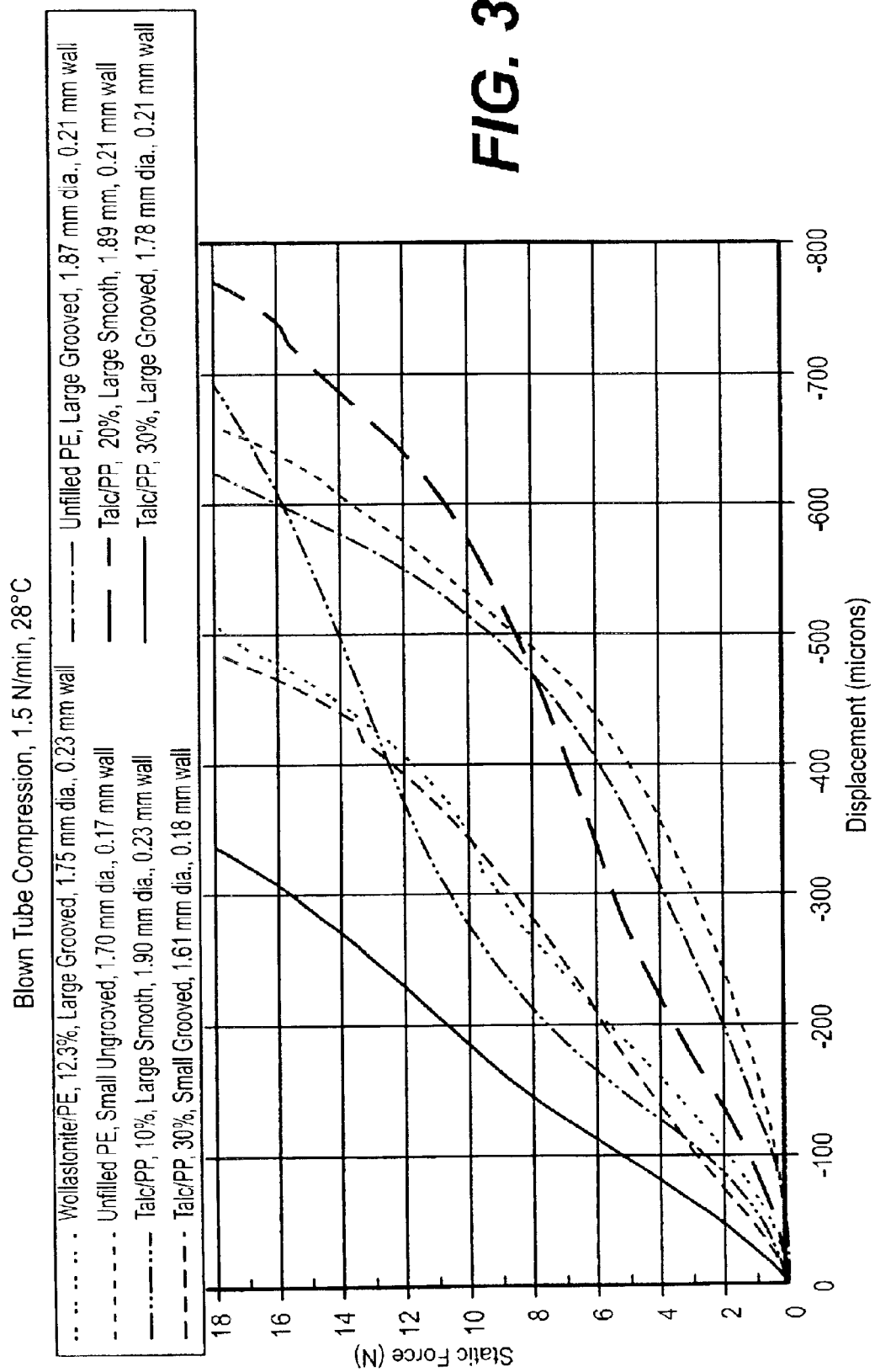

FIBER OPTIC CABLE STRUCTURE AND METHOD

TECHNICAL FIELD

The present invention is generally related to a communication cable and, more particularly, is related to a fiber optic cable structure for installation using blowing techniques and a method for installation.

BACKGROUND OF THE INVENTION

Fiber optic cables have been used for years to transmit information at high rates and very long distances. In a typical fiber optical cable, information is transmitted through a hair-thin optical fiber, usually composed of glass. The glass optical fiber is not typically ductile, and may be easily broken, chipped, and cracked. Such damage to the optical fiber can degrade or attenuate the signal being transmitted. Therefore, optical fibers are housed in cable structures to protect the fibers from damage, such as damage caused by heavy loads; sharp impacts; environmental stresses, including temperature change (especially in indoor/outdoor applications); etc.

For example, environmental temperature variations during product life of the fiber optic cable can cause the typical plastic used as the outer layer of fiber optic cable structures to expand and contract, applying tensile and axial compressive loads on the cable structure, including the glass optical fibers. Similarly, a significant instance of contraction by the plastic can occur during manufacture of the cable itself There are several relatively common cable structures currently being used to protect these hair-thin optical fibers. Such cable structures include the loose tube, the slotted core and the central core structures. In loose tube fiber optic cables, the glass fibers lie in buffer tubes, which are generally filled with some sort of water blocking compound. The loose tube buffer tubes are typically arranged around a central strength member or core and a plastic material is extruded over the buffer tubes and core as the final layer of the cable structure, usually in a continuous, high-speed sheathing operation.

In a slotted core cable, the glass optical fibers are housed in channels or slots that are typically filled with a water blocking material such as a gel. The channels or slots are symmetrically arranged around a central strength member or core, and form helical (or reverse-helical) grooves extending along the longitudinal axis of the cable for receiving one or more glass optical fibers. As with the loose tube configuration, the final layer of a cable structure typically is an extruded plastic jacketing material.

In a monotube cable, the glass fibers are typically housed in a central tube, which is generally filled with some type of water blocking compound. Instead of being centrally located, the strength elements in a monotube cable are arranged linearly along or helically about the central tube. The final layer of the cable structure typically is an extruded plastic jacketing material.

Design and implementation of fiber optic cable structures attempt to balance the need for protection of the thin glass optical fibers against the need for cost effective, easily installed cable structures. Thicker, more rigid cables provide better protection of the fibers, but are difficult to manage and costly to install.

Flexible, easily installed cable structures typically provide less protection to the glass fibers, especially when the cables are to be installed into conduits (such as when installing new fiber optic lines in urban areas). Such installations previously involved pulling the cables through the conduit. Pulling the cable places tensile loads on both the cable structures and glass fibers that can easily damage the fibers, especially in long runs of cable.

Techniques have been developed to use compressed air to blow fiber optic cables into conduits. These techniques typically use compressed air to surround the fiber optic cable in the conduit, buffering the cable from the conduit, and allowing the cable to be installed with much less tensile or compression load being placed on the cable. Additionally, some techniques use the drag created by the compressed air flowing over the surface of the cable to move the fiber optic cable through the conduit.

However, these blowing techniques are typically hampered by the rigidity of typical fiber optic cables, and the surface friction between the cable structure and the conduit. Current cable structures including epoxy and Polybutylene Terephthalate (PBT) structures only address one or the other of the impediments to blowing, and are not cost effective.

Accordingly, there does not exist a fiber optic cable structure that is sufficiently flexible and low in surface friction to allow easy installation of the cable structure in conduits through a blowing technique, while at the same time providing sufficient protection to the glass optical fibers carrying the signals.

Thus, a heretofore-unaddressed need exists in the industry to address the aforementioned deficiencies and inadequacies.

SUMMARY OF THE INVENTION

The foregoing problems have been overcome by an optical fiber cable structure including a tube comprised of inorganic fillers dispersed within a soft resin, the tube housing optic fibers or ribbons surrounded by a water blocking material. The use of the inorganic fillers in the soft resin will provide a cable structure with superior blowing performance due to low surface friction and high flexibility, allowing more effective installation of the fiber optic cable via blowing techniques.

The use of the inorganic fillers in the soft resin reduces the thermal expansion/contraction of the cable structure, resulting in improved optical performance at temperature extremes encountered in the Outside Plant environment. The use of the inorganic fillers in the soft resin also improves processing stability during cable fabrication, and increases the robustness of the cable structure, including the compression resistance of the cable structure to axial loads, providing protection to the optical fibers.

Possible examples of the type of resins that may be incorporated into the cable structure include: polyethylenes; impact-modified polypropylene; polypropylene-based thermoplastic olefins; ethylene-vinyl acetate resins; plasticized poly(vinyl chloride); polyester-based thermoplastic elastomers; and polyether-based thermoplastic elastomers or any other base resin with an elastic (Young's) modulus of 200,000 psi or less at 25° C.

The fillers may be either fibrous, platelike, or round in nature and possible fillers include: talc; wollastonite; mica; montmorillionite; bentonite; kaolinite clay; smectite clays; synthetic clays; fumed silica; fumed alumina; glass beads; glass flake; glass fiber; aluminum trihydrate; and magnesium hydroxide.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a graph of Static Force versus Displacement for a variety of embodiments of the present invention, and for typical cable materials.

DETAILED DESCRIPTION OF THE INVENTION

Figure 1:
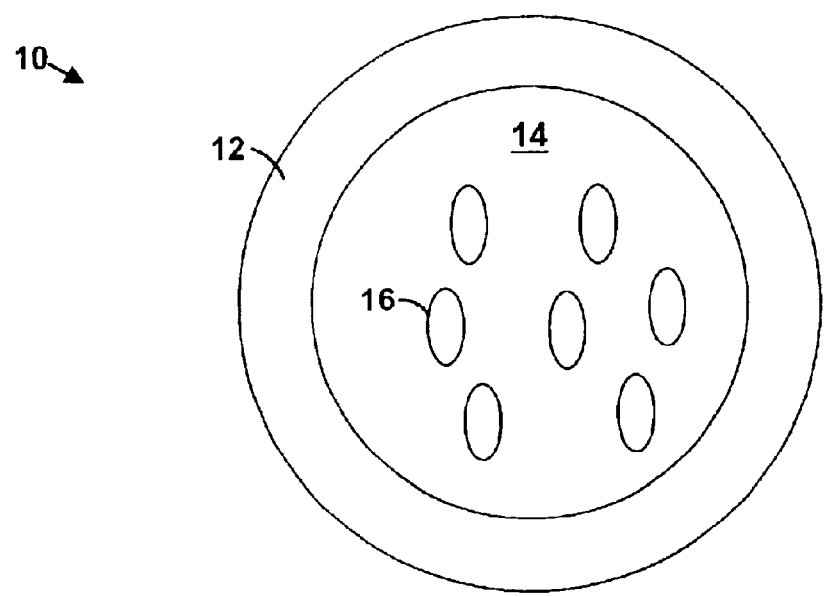
FIG. 1 is a cross-sectional end view of one embodiment of the present invention.

FIG. 1 shows a cross sectional end view of a preferred embodiment of the present invention. As depicted in FIG. 1, a preferred cable structure 10 includes a hollow tube 12. Contained within the interior cavity of the tube 12 are one or more fiber optic elements 16. The fiber optic elements 16 may include individual fibers, fiber optic ribbons, or like elements, and in FIG. 1 are depicted as fiber optic ribbons.

Surrounding the fiber optic elements 16 within the tube 12 is a waterblocking material 14, such as a gel, soft rubber, foam, a dry water-swellable material, or other appropriate material. A means of blocking water propagation down the length of the cable is an industry-standard requirement for all cables installed in outdoor environments. In the preferred embodiment, the waterblocking material 14 is a thixtropic gel as the thixtropic gel helps impart additional crush resistance to the tube 12.

In the embodiment depicted in FIG. 1, the tube 12 comprises a resin containing inorganic fillers as described below and the reference to "fillers" herein concerns the fillers disposed within the resin of the tube 12 as opposed to any contents that may be contained within the interior cavity of the tube 12. The tube 12 depicted in FIG. 1 is substantially round, although other shapes may be used. The outside surface of the tube 12 is depicted as substantially smooth. In the preferred embodiment the tube 12 will include an outside surface containing linear or helical grooves (not shown), the grooves running substantially along the length of the cable structure 10.

As indicated in the co-pending U.S. patent application to Fett et al., U.S. patent application Ser. No. 10/095,651, which is incorporated herein by reference, the use of such grooves on the outer surface of the tube 12 reduces the surface area of the tube 12 that will be in contact with a conduit during installation of the cable structure 10 into a conduit. This reduction in tube 12 surface area in contact with the conduit may serve to further reduce the surface friction between the tube cable structure 10 and conduit during installation as disclosed in Fett et al., Ser. No. 10/095,651.

As described below, for the preferred tube 12 of the present invention, the surface friction of the tube 12 appears to be largely insensitive to the presence of grooves on the outer surface of the tube 12. However, the presence of such grooves is still preferred to reduce the contact area between the tube 12 and conduit during installation.

The dimensions of the tube 12 may vary in accordance with the number and nature of the optic elements 16 within the tube 12, and the dimensions of the conduit into which the cable structure 10 will be installed. In the preferred embodiment, the tube 12 will be dimensioned to hold twelve loose optical fibers. The tube 12 in this embodiment will have an outer diameter of approximately 1.5 mm to 2.0 mm, and preferably 1.6 mm, which is an improvement over other cable structures, which typically only allow for 2–8 optical fibers in a 1.6 mm diameter tube 12. In other embodiments, the tube 12 may have a larger or smaller outer diameter as needed to accommodate a preferred range of 1 to 144 loose optic fibers or the equivalent fiber optic ribbons.

In the preferred embodiment, the tube 12 will be fabricated by extrusion of a compounded filled resin. The preferred tube 12 is directly extruded around the optical fiber elements 16, without the addition of separate strength members to the cable structure 10.

Figure 2:
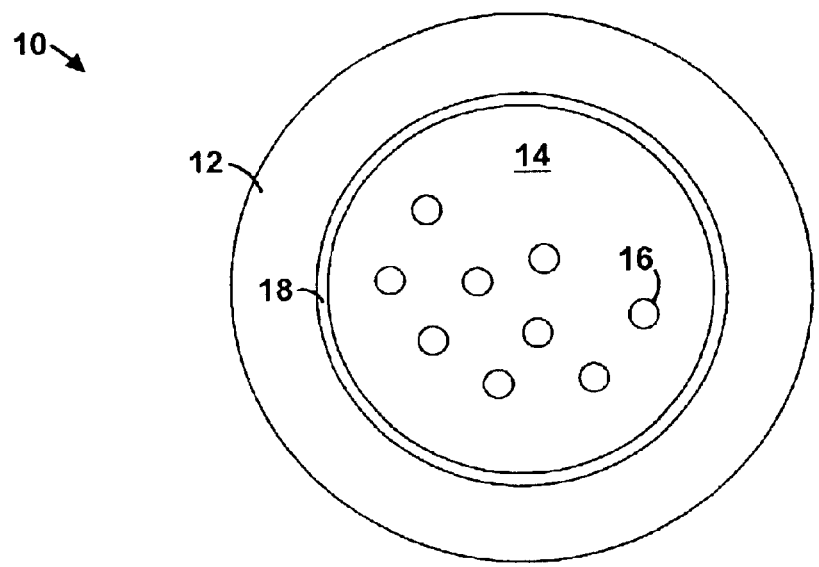
FIG. 2 is a cross-sectional end view of another embodiment of the present invention.

FIG. 2 shows a cross sectional end view of an alternate preferred embodiment of the present invention. As depicted in FIG. 2, this preferred cable structure 10 includes a hollow tube 12. Disposed on the interior surface of the tube 12 of FIG. 2 is an inner layer 18. Contained within the interior cavity of the tube 12 with the inner layer 18 are one or more fiber optic elements 16. The fiber optic elements 16 may include individual fibers, fiber optic ribbons, or like elements, and in FIG. 2 are depicted as individual fibers.

Surrounding the fiber optic elements 16 within the interior cavity of the tube 12 with the inner layer 18, is a waterblocking material 14, such as a gel, soft rubber, foam, dry water-swellable material, or other appropriate material. In the preferred embodiment, the waterblocking material 14 is a thixtropic gel as the thixtropic gel helps impart additional crush resistance to the tube 12.

As with the embodiment depicted in FIG. 1, the tube 12 depicted in FIG. 2 comprises a resin with inorganic fillers as described below and the use of the term "fillers" refers to the presence of fillers in the resin. The preferred inner layer 18 of FIG. 2 is comprised of an unfilled resin, or a resin without fillers, however, a filled resin may be used for the inner layer 18 in some embodiments.

The inner layer 18 is substantially smooth and is implemented in the alternative preferred embodiment for use with a tube 12 comprised of a resin having a substantially rough inner surface. Various resin/filler combinations of the preferred tube 12 may have a substantially rough inner surface. Such a rough inner surface may contribute to a signal loss or attenuation in the fiber optic elements 16, such as through microbending loss. To minimize such loss, a smooth inner layer 18 may be disposed on the interior surface of the tube 12 as depicted in FIG. 2.

As in the preferred embodiment depicted in FIG. 1, the tube 12 of the embodiment depicted in FIG. 2 is substantially round, although other shapes may be used. The outside surface of the tube 12 is depicted as substantially smooth. In the preferred embodiment the tube 12 will include an outside surface containing linear or helical grooves (not shown), the grooves running substantially along the length of the cable structure 10.

As indicated in the co-pending U.S. patent application to Fett et al., U.S. patent application Ser. No. 10/095,651, the use of such grooves on the outer surface of the tube 12 will reduce the surface area of the tube 12 that will be in contact with a conduit during installation of the cable structure 10 into a conduit, serving to further reduce the surface friction between the tube cable structure 10 and conduit during installation.

For the tube 12 depicted in FIG. 2, the surface friction of the tube 12 appears to be largely insensitive to the presence of grooves on the outer surface of the tube 12 as described below. However, the presence of such grooves is still preferred to reduce the contact area between the tube 12 and conduit during installation.

The dimensions of the tube 12 depicted in FIG. 2 may vary in accordance with the number and nature of the optic elements 16 contained within the tube 12, and the dimensions of the conduit into which the cable structure 10 will be installed. In the preferred embodiment, the tube 12 will be dimensioned to hold twelve loose optical fibers. The tube 12 in this embodiment will have an outer diameter of approximately 1.5 mm to 2.0 mm, preferably 1.8 mm, which is an improvement over other cable structures which typically only allow for 2–8 optical fibers in a 1.8 mm diameter tube 12. In other embodiments, the tube 12 may have a larger or smaller outer diameter as needed to accommodate a preferred range of 1 to 144 loose optic fibers or the equivalent fiber optic ribbons.

In the preferred embodiment, the tube 12 with an inner layer 18 depicted in FIG. 2 will be fabricated by extrusion. As known to one of ordinary skill in the art, the tube 12 with the inner layer 18 may be extruded through a variety of techniques, including a two-pass extrusion, tandem extrusion, or co-extrusion, of the filled resin comprising the tube 12, and the resin (filled or unfilled) comprising the inner layer 18.

Materials of Construction

Resins

The preferred tube 12 of the present invention includes a base resin capable of being extruded into a tube, where the resin comprises a "soft" more flexible material than typical PBT-based fiber optic cables. Extrudable resins that are suitable as the base for the tube 12 of the preferred embodiment include: polyethylenes, including high-density polyethylene, medium-density polyethylene, linear low-density polyethylene, and low-density polyethylene; impact-modified polypropylene; polypropylene-based thermoplastic olefins; ethylene-vinyl acetate resins; plasticized polyvinyl chloride; polyester-based thermoplastic elastomers; and polyether-based thermoplastic elastomers.

The resin for the tube 12 should preferably have an elastic (Young's) modulus of 200,000 psi or less at 25° C., with a Young's modulus of 60,000 psi being preferred. The resin may also advantageously contain additives such as antioxidants, UV stabilizers, anti-static agents, processing aids such as stearate waxes or fluoroelastomers, and/or coloring agents to facilitate identification of the tubes 12.

Anti-static agents may further improve the friction properties of the tube 12. Static buildup can create an attractive force between the tube and the conduit, increasing friction and reducing the maximum blowing distance. Static buildup can also make 'fleeting' or coiling the tube more difficult.

Carbon black or other UV stabilizers may be added to the resin. The advantage adding a UV stabilizer is that while lifetime durability of the tube 12 with the resin containing the filler may be unknown, addition of the UV stabilizer will provide known protection against potential environmental damage such as ultraviolet radiation. Carbon black stabilizes the plastic against degradation by ultraviolet light by absorbing incident light and releasing the energy as harmless heat. The efficacy of carbon black stabilization has been reviewed in *Polymer Engineering and Science*, v. 9, p. 286, by J. B. Howard and H. M. Gilroy, 1969.

Fillers

The more flexible resins of the preferred tube 12, while desirable in some aspects for installation in conduits through blowing techniques, by themselves, are not very robust. The preferred resins have marginal optical performance at low temperatures (because of thermal contraction), and have high coefficients of surface friction, detracting from their effectiveness as a material for optic cables for blown installation.

The use of fillers within polymers to improve the robustness of the polymers by increasing shear modulus, tensile strength and abrasion resistance is known in the art, and is discussed in *Polymer Blends And Composites*, p. 375–430, by Manson and Sperling, 1978; and *Fillers*, Chap. 5, by G. Wypych, 1993. The information concerning the improved robustness from the use of fillers in these publications is incorporated herein by reference.

Additionally, it has been discovered that the use of the preferred fillers in the preferred resins typically results in a decreased coefficient of surface friction. The preferred tube 12, therefore, includes an inorganic filler distributed throughout the resin to help remedy the deficiencies present if the resin is used by itself without fillers.

Inorganic fillers that may be used in the preferred tube 12 include: talc; wollastonite; mica; kaolinite clay; smectite clays such as bentonite or montmorillionite; synthetic clays; fumed silica; fumed alumina; glass beads; glass flake; glass fiber; aluminum trihydrate; and magnesium hydroxide. The fillers may be round, platelike or fibrous/needlelike in shape. All shapes have been discovered to aid in reducing surface friction. However, the preferred shapes are the platelike and fibrous/needlelike fillers, which better control thermal expansion and shrinkage of the finished cable. Platelike and fibrous/needlelike fillers also impart higher viscosity to the base resin, leading to improved extrusion performance.

Note that in some embodiments, as described below, certain types of round fillers will be preferred for their flame retardant properties.

Some, but not all of the preferred fillers in the present invention are similar to fillers disclosed in the commonly assigned patent to Dixon et al., U.S. Pat. No. 6,324,324B1, which is incorporated herein by reference. However, in the present invention, lower aspect ratios are possible.

For fibrous or needlelike fillers, the aspect ratio is determined by the fiber's length divided by its diameter. Thus, the equation describing aspect ratio is $a=L/D$, where a is aspect ratio, L is fiber length, and D is fiber diameter.

For platelike fillers, the aspect ratio may be defined as $a=D/t$, where a is aspect ratio, D is particle diameter, and t is particle thickness, measured for a group of particles. If the particle is modeled as an ellipse, the diameter may be calculated as the average of the major and minor axes of the ellipse. This mode of calculating aspect ratio is known in the art and is described in *Polymer Engineering and Science*, v. 23, p. 766, by C. Busigin, G. M. Martinez, R. T. Woodhams and R. Lahtinen, 1983.

As noted, in the present invention, lower aspect ratios may be used for the filler in the tube 12, including aspect ratios of 5:1 or lower for platelike or fibrous/needlelike fillers. The particular aspect ratio chosen for the preferred filler is a balance between modulus, reduction of thermal expansion/contraction and shrinkage, and smoothness of the inner surface of the tube 12, keeping in mind that a rougher inner surface can lead to microbending loss, and may preferably lead to the decision to use an additional inner layer 18 as depicted in FIG. 2, and described above.

For example, use of higher aspect ratio fillers will generally result in a tube 12 with a higher flexural modulus (and better compression resistance), reduced shrinkage, and a rougher inner surface. The balance of these factors in the present invention directed to fiber optic cable structures 10 cable of being installed through blowing techniques suggests, for both platelike and fibrous/needlelike fillers, a preferred aspect ratio ranging from a low of approximately 5:1 up to a high of approximately 100:1.

Substantially round fillers will be less effective at increasing flexural modulus, but will still be effective at reducing surface friction, and can additionally impart other desirable properties such as flame retardancy.

In order to ensure good filler dispersion within the resin, the use of coupling agents as discussed in Dixon et al., U.S. Pat. No. 6,324,324B1, is preferred.

Preferred Fillers/Resins

Preferably, the tube 12 will comprise a resin containing 0.5 wt % or more inorganic filler. Polypropylene is a preferred resin because of its excellent high-temperature properties. With a melting temperature of 165° C., polypropylene will not soften at service or installation temperatures under known blowing techniques. Note that the cable structure 10 will generally be exposed to elevated temperatures during installation, as the compressors used for blown installation of fiber optic cables tend to produce air heated above ambient temperatures.

Talc is the preferred filler for most applications as discussed below. Additionally, aluminum trihydrate (ATH) or magnesium hydroxide (MgOH) are preferred fillers in applications where flame-retardancy is desired, such as indoor/outdoor applications where the tube 12 may be used as a direct drop from an outdoor environment, as would be known to one of ordinary skill in the art.

Based on optical attenuation results, as well as the results discussed below, the preferred embodiment is impact-modified polyethylene with a 30 wt % talc filler.

Surface Friction

One of the advantages of the present invention is superior blowing performance due to low surface friction resulting from addition of the preferred fillers to the preferred resins. The surface frictions of various embodiments of the tube 12 were measured using a "knot test." In the version of the test applied here, the tubes 12 were first rubbed clean with an alcohol wipe, then allowed to dry in air for at least 10 minutes. The tube 12 was tied into a double overhand knot with a 5-inch diameter.

The tube 12 was loaded into an Instron material testing machine, and pulled so as to tighten the knot. The force required to pull the knot closed was recorded. Table 1, below, reports the peak force and the average force between 15% and 85% of the crosshead travel distance. The force represents a relative measure of the self-dynamic coefficient of friction of these tubes.

Note that all of the tubes 12 in Table 1 are between 1.6 and 1.9 mm in diameter, and contain twelve optical fibers surrounded by a thixotropic gel. More specifically, the tubes 12 in Table 1 are approximately 1.8-mm diameter, except for the 30 wt % talc sample, which is approximately 1.6-mm diameter. Additionally, the column "Color" indicates the presence (or lack) of a color additive to the resin tested. Further, the column "Grooves" indicates the presence (or lack) of longitudinal grooves disposed on the outside surface of the tube 12 as discussed above.

TABLE 1

| Tube | Color | Grooves? | Average Maximum Load, g | Average Load, g |
| --- | --- | --- | --- | --- |
| Unfilled PE | Blue | yes | 64.17 | 56.62 |
| Unfilled PE | Natural | no | 321.56 | 280.38 |
| Unfilled PE | Aqua | no | 180.7 | 158.44 |
| PE, 12.3 wt % Wollastonite | Black | yes | 43.73 | 38.33 |
| Impact-Modified PP, 10 wt % Talc | Natural | no | 93.86 | 83.89 |
| Impact-Modified PP, 20 wt % Talc | Natural | no | 78.22 | 69.32 |
| Impact-Modified PP, 30 wt % Talc | Black | yes | 67.40 | 58.97 |

As indicated in Table 1, the addition of fillers to the resin substantially reduces the surface friction at room temperature. Similarly, the addition of color to the resin reduces friction, which is thought to be due to the presence of waxes and other friction-reducing additives in the color concentrate added to the resin. An unexpected result is that in resins with the added fillers, unlike the unfilled resins, surface friction seems to be less sensitive to the addition of pigments or to the existence of grooves on the outer surface of the tubes 12.

Compression Resistance

An additional advantage of the tube 12 of the present invention is the increased compression resistance obtained by use of the fillers in the resin. The filled polyolefin materials of the preferred tube 12 are substantially more flexible than cable structures 10 made from plastics such as PBT, resulting in a cable structure 10 that is easier, and more cost effective to install, especially within conduits containing multiple curves and/or turns. The addition of the preferred fillers to the preferred resins results in a tube 12 that is more flexible than plastics such as PBT, while at the same time, has better resistance than unfilled resins to compression stresses that can flatten a fiber optic cable and damage the fiber optic elements 16.

Compression tests were performed at 25° C. using a TA Instruments Model 2980 Dynamic Mechanical Analyzer. Short lengths of tubes were cut and clamped at the ends, to prevent leakage of cable gel. Samples were loaded between small platens, and compressed at a rate of 1.5 N/min to a total force of 18 N.

Note that the samples are divided into "grooved" and "smooth" indicating the presence (or lack) of longitudinal grooves disposed on the outside surface of the tube 12 as discussed above. The samples are also divided into "large tube" and "small tube" samples. The "large tube" samples typically had outer diameters of 1.8 mm or greater while the "small tube" samples had outside diameters of 1.6 mm or smaller.

Results are shown in FIG. 3. As depicted in FIG. 3, it can be seen that the fillers are effective at enhancing crush resistance. All of the tubes 12 with fillers have higher crush resistance than the samples without fillers. Looking at the preferred embodiment, the grooved PP tube 12 with 30 wt % talc and an outer diameter of 1.61 mm, at a compressive force of 6N, the deflection (change in thickness) was half that of the unfilled PE samples, indicating a substantial increase in crush resistance.

The larger tubes 12 had higher compression resistance than the smaller tubes 12, as these tubes had higher average wall thicknesses. The tube 12 made with 10 wt % talc exhibits higher compression resistance than the tube made with 20 wt % talc. This difference could be due to the higher wall thickness of the 10 wt % talc tube. Also, alignment of the fillers could affect tube compression resistance in this case—if the fillers in the sample containing 10 wt % talc were well aligned in the extrusion direction, compression resistance could be enhanced as a result. Most importantly, as expected, the tubes 12 with the preferred filler of 30 wt % talc have higher crush resistance than all of the other tubes.

Thermal Expansion

Another advantage of the tube 12 of the present invention is the reduction of thermal expansion with the introduction of the filler into the resin. The reduction of thermal expansion leads to improved optical performance of the optic fiber elements 16 (FIG. 1 and FIG. 2) at temperature extremes and/or during cycling temperatures.

As known to one of ordinary skill in the art, the large coefficient of thermal expansion (CTE) of typical unfilled plastics used in cable structures 10 means that the unfilled plastics can experience significant contraction and/or expansion with corresponding temperature drops and/or increases, especially at extreme temperatures. The fiber optic elements 16 with a lower CTE will not experience corresponding contraction/expansion.

The greater CTE of the unfilled plastics coupled with the lower CTE of the fiber optic elements 16 can lead to stresses upon the fiber optic elements 16, causing attenuation of the optical signal carried by the fiber optic elements 16. A benefit of the tubes 12 of the present invention is that the reduced CTE of the tube 12 allows a closer "match" between the CTE of the tube 12 and the CTE of the fiber optic elements 16. The closer "match" reduces thermal stresses on the fiber optic elements 16 and improves optical performance, especially at lower temperatures.

Table 2 below demonstrates example reduced CTE results for various resins with various fillers as compared to the CTE results for two unfilled commercial fiber optic resins.

TABLE 2

| Sample | Expansion Coefficient, ppm/° C. | Average ppm/° C. |
| --- | --- | --- |
| Impact-Modified PP - 20 wt % talc | 47 | 43 |
|  | 39 |  |
| Impact-Modified PP - 10 wt % talc | 69 | 68 |
|  | 66 |  |
| Impact-Modified PP - 30 wt % talc | 51 | 48 |
|  | 45 |  |
| Dow Chemical 8479 Unfilled PE | 141 | 145 |
|  | 149 |  |
| Dow Chemical 8864 Unfilled PE | 169 | 169 |
|  | 169 |  |

Samples for the thermal expansion measurements were prepared by fabricating a solid "rod" of material by forcing molten plastic through the die of a Kayness capillary rheometer. After the rod cooled, flat samples were cut with a razor blade. Samples were loaded in a Perkin-Elmer DMA-7e dynamic mechanical analyzer equipped for thermal expansion measurements, and heated from −60° C. to room temperature at 2° C./minute. The instrument recorded the position of a stylus resting on the sample as the sample is heated. The CTE was measured by calculating the slope of the stylus height vs. temperature curve. Results are given in Table 2.

Comparing the filled materials to two grades of unfilled polyethylene, the CTE of the filled materials is much lower and more closely corresponds to the typical CTE of fiber optic elements 16. Looking at Table 2, the difference in the CTE of the 20 wt % talc sample and the 30 wt % talc sample is within the margin of error of the instrument.

Many variations and modifications may be made to the above-described embodiment(s) of the invention without departing substantially from the spirit and principles of the invention. All such modifications and variations are intended to be included herein within the scope of the present invention.

What is claimed is:

1. A fiber optic cable structure, the cable structure comprising:
   a tube, the tube being hollow and containing an interior cavity, wherein the tube comprises:
      a soft resin, the soft resin having an elastic modulus of 200,000 psi or less at 25° C.; and
      inorganic fillers disposed in the soft resin so as to decrease the surface friction of the outside surface of the tube;
   the wherein fillers occupy a volume of the soft resin between 0.5 wt % and 45 wt %.

2. The fiber optic cable structure of claim 1, wherein the fillers are further disposed in the soft resin so as to increase the resistance of the tube to compression from axial loads.

3. The fiber optic cable structure of claim 1, wherein the fillers are further disposed in the soft resin so as to reduce thermal expansion and contraction of the tube.

4. The fiber optic cable structure of claim 1, wherein the soft resin is selected from the group consisting of:
   polyethylenes, impact-modified polypropylene, polypropylene-based thermoplastic olefins, ethylene-vinyl acetate resins, plasticized polyvinyl chloride, polyester-based thermoplastic elastomers, and polyether-based thermoplastic elastomers.

5. The fiber optic cable structure of claim 1, wherein the tube further comprises an inner layer disposed along an inner surface of the interior cavity of the tube.

6. The fiber optic cable structure of claim 5, wherein the inner layer comprises a resin.

7. The fiber optic cable structure of claim 6, wherein the inner layer comprises a resin containing fillers.

8. A fiber optic cable structure, the cable structure comprising:
   a tube, the tube being hollow and containing an interior cavity, wherein the tube comprises:
      a soft resin, the soft resin having an elastic modulus of 200,000 psi or less at 25° C.; and
      inorganic fillers disposed in the soft resin so as to decrease the surface friction of the outside surface of the tube;
   wherein the fillers are needlelike.

9. The fiber optic cable structure of claim 8 wherein the fillers are selected from the group consisting of:
   wollastonite and glass fiber.

10. The fiber optic cable structure of claim 9, wherein the aspect ratio of the fillers is between 5:1 and 100:1.

11. The fiber optic cable structure of claim 8, wherein the tube further comprises an inner layer disposed along an inner surface of the interior cavity of the tube.

12. The fiber optic cable structure of claim 11, wherein the inner layer comprises a resin.

13. The fiber optic cable structure of claim 11, wherein the inner layer comprises a resin containing fillers.

14. A fiber optic cable structure, the cable structure comprising:
   a tube, the tube being hollow and containing an interior cavity, wherein the tube comprises:
      a soft resin, the soft resin having an elastic modulus of 200,000 psi or less at 25° C.; and inorganic fillers disposed in the soft resin so as to decrease the surface friction of the outside surface of the tube;
wherein the fillers are platelike.

15. The fiber optic cable structure of claim 14, wherein the fillers are selected from the group consisting of:
talc, mica, montmorillionite, bentonite, kaolinite clay, smectite clays, synthetic clays, and glass flake.

16. The fiber optic cable structure of claim 15, wherein the aspect ratio of the fillers is between 5:1 and 100:1.

17. The fiber optic cable structure of claim 14, wherein the tube further comprises an inner layer disposed along an inner surface of the interior cavity of the tube.

18. The fiber optic cable structure of claim 17, wherein the inner layer comprises a resin.

19. The fiber optic cable structure of claim 17, wherein the inner layer comprises a resin containing fillers.

20. A fiber optic cable structure, the cable structure comprising:
a tube, the tube being hollow and containing an interior cavity, wherein the tube comprises:
a soft resin, the soft resin having an elastic modulus of 200,000 psi or less at 25° C.; and
inorganic fillers disposed in the soft resin so as to decrease the surface friction of the outside surface of the tube;
wherein the fillers are round.

21. The fiber optic cable structure of claim 20, wherein the fillers are selected from the group consisting of:
fumed silica, fumed alumina, glass beads, aluminum trihydrate, and magnesium hydroxide.

22. The fiber optic cable structure of claim 20, wherein the tube further comprises an inner layer disposed along an inner surface of the interior cavity of the tube.

23. The fiber optic cable structure of claim 22, wherein the inner layer comprises a resin.

24. The fiber optic cable structure of claim 22, wherein the inner layer comprises a resin containing fillers.

25. A fiber optic cable structure, the cable structure comprising:
a tube, the tube being hollow and containing an interior cavity, wherein the tube comprises:
a soft resin, the soft resin having an elastic modulus of 200,000 psi or less at 25° C.; and
inorganic fillers disposed in the soft resin so as to decrease the surface friction of the outside surface of the tube;
wherein the tube is dimensioned to contain at least twelve fiber optic elements within the interior cavity of the tube.

26. The fiber optic cable structure of claim 25, wherein the tube has an outer diameter of between 1.5 mm and 2.0 mm.

27. The fiber optic cable structure of claim 26, wherein the tube further contains a water blocking material, the water blocking material surrounding the fiber optic elements.

28. The fiber optic cable structure of claim 27, wherein the water blocking material comprises a thixotropic gel.

29. The fiber optic cable structure of claim 27, wherein the water blocking material comprises a dry waterswellable material.

30. The fiber optic cable structure of claim 27, wherein the water blocking material comprises an extruded soft polymer.

31. The fiber optic cable structure of claim 27, wherein the water blocking material comprises a soft crosslinked polymer, wherein the crosslinked polymer is cured by ultraviolet light.

32. The fiber optic cable structure of claim 25, wherein the tube further comprises an inner layer disposed along an inner surface of the interior cavity of the tube.

33. The fiber optic cable structure of claim 32, wherein the inner layer comprises a resin.

34. The fiber optic cable structure of claim 32, wherein the inner layer comprises a resin containing fillers.

35. A fiber optic cable structure, the cable structure comprising:
a tube, the tube being hollow and containing an interior cavity, wherein the tube comprises:
a soft resin, the soft resin having an elastic modulus of 200,000 psi or less at 25° C.; and
inorganic fillers disposed in the soft resin so as to decrease the surface friction of the outside surface of the tube;
wherein the tube further comprises impact-modified polypropylene containing 30 wt % talc fillers.

36. The fiber optic cable structure of claim 35, wherein the tube further comprises an inner layer disposed along an inner surface of the interior cavity of the tube.

37. The fiber optic cable structure of claim 36, wherein the inner layer comprises a resin.

38. The fiber optic cable structure of claim 36, wherein the inner layer comprises a resin containing fillers.

39. A method of manufacturing a fiber optic cable, the method comprising the steps of:
providing a soft resin;
adding inorganic fillers to the soft resin; and
forming the soft resin containing the fillers into a hollow tube;
wherein the tube has a central cavity;
wherein the fillers added to the soft resin decrease the surface friction of the outside surface of the tube, and increase the resistance of the tube to compression by axial loads; and
wherein the soft resin contains at least 0.5 wt % fillers.

40. The method of claim 39, wherein the method further comprises the step of adding a coupling agent to the resin to aid in dispersion of the fillers in the soft resin.

41. The method of claim 39, wherein the method further comprises the step of adding an ultraviolet stabilizer to the soft resin.

42. The method of claim 41, wherein the ultraviolet stabilizer comprises carbon black.

43. The method of claim 39, wherein the method further comprises the step of adding an anti-static agent to the soft resin.

44. The method of claim 39, wherein the method further comprises the step of forming an inner layer disposed on an inner surface of the cavity of the tube.

45. A method of manufacturing a fiber optic cable, the method comprising the steps of:
providing a soft resin;
adding inorganic fillers to the soft resin; and
forming the soft resin containing the fillers into a hollow tube;
wherein the tube has a central cavity;
wherein the fillers added to the soft resin decrease the surface friction of the outside surface of the tube, and increase the resistance of the tube to compression by axial loads; and
wherein the aspect ratio of the fillers is at least 5:1.

46. A method of manufacturing a fiber optic cable, the method comprising the steps of:
providing a soft resin;
adding inorganic fillers to the soft resin; and
forming the soft resin containing the fillers into a hollow tube;

wherein the tube has a central cavity;
wherein the fillers added to the soft resin decrease the surface friction of the outside surface of the tube, and increase the resistance of the tube to compression by axial loads;

wherein the method further comprises the step of forming an inner layer disposed on an inner surface of the cavity of the tube; and
wherein the inner layer comprises a second resin.

* * * * *